Dec. 4, 1951
A. B. NEARING ET AL
2,577,145
COUPLING DEVICE
Filed April 22, 1948
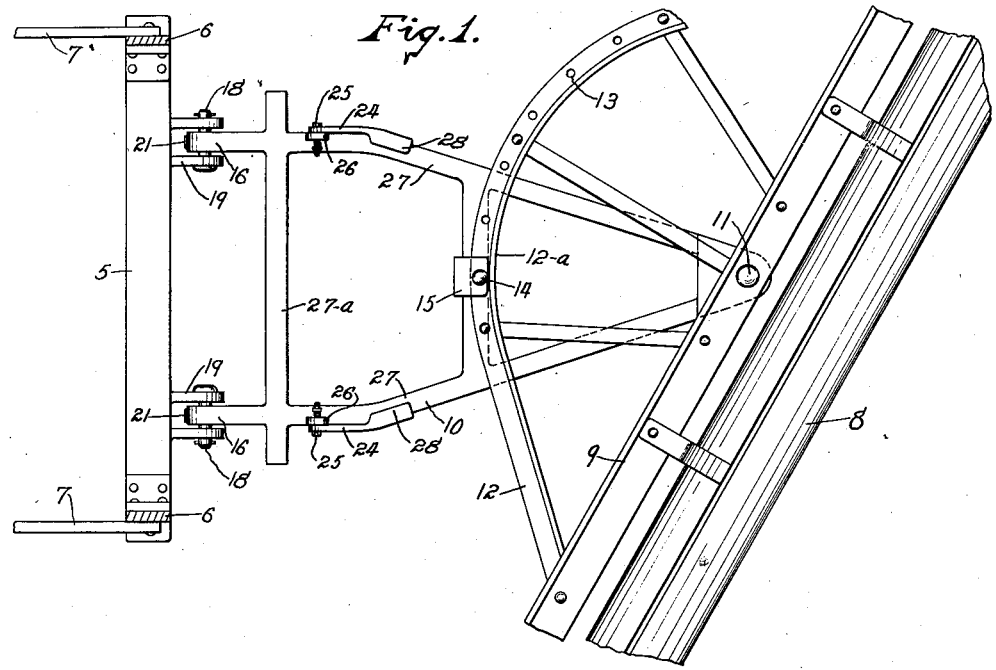
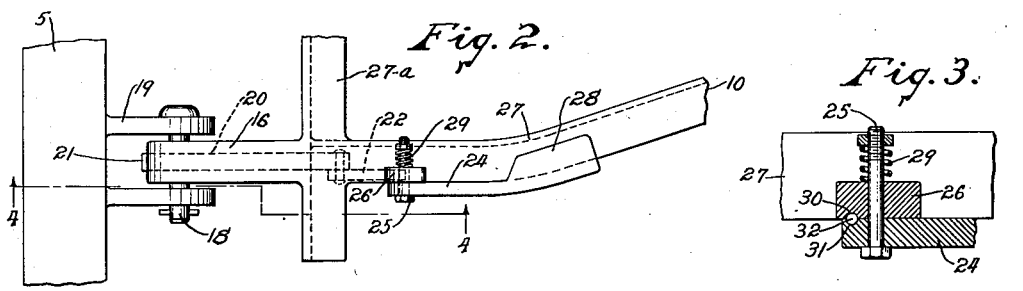 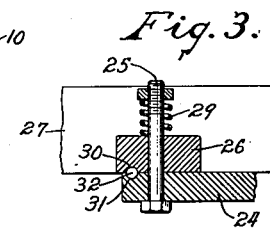
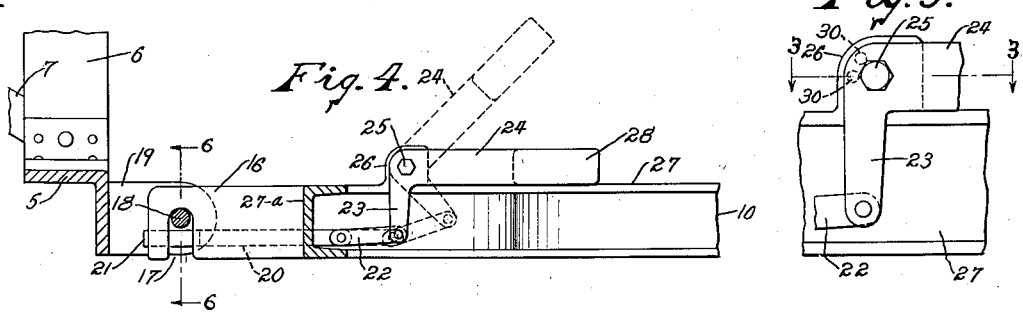 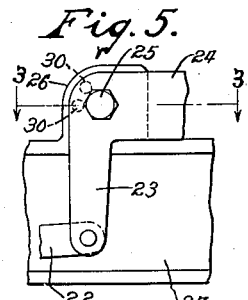
INVENTOR.
ALLAN B. NEARING
BY EDWARD U. SANDIN
Louis V. Lucia
ATTORNEY Patented Dec. 4, 1951

2,577,145

UNITED STATES PATENT OFFICE 2,577,145

COUPLING DEVICE

Allan B. Nearing and Edward U. Sandin,
West Hartford, Conn.

Application April 22, 1948, Serial No. 22,658

4 Claims. (Cl. 280—33.15)

This invention relates to a coupling device and more particularly to such devices as are intended for securing a snowplow to a vehicle such as a tractor or a truck.

The primary object of this invention is to provide such a coupling device which will greatly facilitate the operation of attaching the snowplow to the vehicle.

A further object of the invention is to provide a coupling which may be operated from a convenient position and without requiring the operator to lie under the vehicle in order to reach and operate the coupling mechanism.

A still further object of this invention is to provide such a coupling device which can be easily operated for quickly attaching or detaching a snowplow relatively to the vehicle.

Further objects and advantages of this invention will be more clearly understood from the following description and from the accompanying drawings in which:

Fig. 1 is a plan view of a coupling device embodying our invention and showing a portion of a snowplow and a portion of the vehicle frame to which the plow is attached.

Fig. 2 is an enlarged plan view of a portion of the mechanism illustrated in Fig. 1.

Fig. 3 is a fragmentary sectional view on line 3—3 of Fig. 5.

Fig. 4 is a side view on line 4—4 of Fig. 2.

Fig. 5 is an enlarged fragmentary view of the operating lever on our improved coupling device.

Fig. 6 is a sectional view of the hook portion only on line 6—6 of Fig. 4.

In the embodiment shown in the drawings, the numeral 5 denotes a supporting bar which may be secured to the frame of a vehicle, such as a tractor or truck. In the form shown, said bar may be hung from the front portion of the vehicle by means of hanger bars 6—6 and braced on said frame by bracing bars 7—7.

A snow plow 8 of conventional construction is preferably secured to a supporting bar 9 which is mounted on a supporting frame 10 and swivelly secured thereto by means of a swivel pin 11. In the form shown, the supporting bar 9 is provided with a securing frame, preferably in the form of an angle bar 12 which is fastened to the opposite ends of the bar 9 and curved at 12-a on a radius having its center at the swivel point 11. This bar 12 is provided with a series of holes 13 to receive a positioning pin 14 which extends through a fastening plate 15 mounted on the frame 10 and thereby secures the plow at different selected angles with relation to the axes of the vehicle frame.

Although we have illustrated the use of our invention in connection with a snowplow, it is to be understood that the same may be used for coupling various other devices and our invention is particularly related to a support for such devices, such as the frame 10 above described.

Our invention provides a coupling mechanism which comprises a pair of hooks 16—16 each of which has a notch 17 adapted to receive a stud or bolt 18 on a supporting bracket 19 fastened to the front of the bar 5.

The said hooks have a longitudinal opening 20 extending therethrough in which is slidedly mounted a locking bolt 21 that extends across the notch 17 as clearly illustrated in Fig. 4. This locking bolt is connected, by means of a locking link 22, to an arm 23 of an operating lever 24 which is pivoted by means of a pivot bolt 25 to a bracket 26 on one of the channel bars 27—27 which are connected by a tie bar 27-a comprising a part of the frame 10. This channel bar 27 being curved, the lever 24 is also curved to conform therewith. The locking bolt 21 is normally retained in locking position by means of a counterweight portion 28 on the end of the lever 24 which rests upon the top of the channel bar 27 and holds the lever downwardly. In the preferred form shown, the lever 24 is urged into engagement with the side of the bracket 26 by means of a spring 29. The side of the said bracket abutting the inner face of the lever 24 is provided with a pair of recesses 30—30 and the co-acting side of the lever 24 is provided with a recess 31 in which there is contained a ball 32 that is retained in either one of the recesses 30—30 by means of the spring 29 so that the lever 4 would be retained normally either in the locked position or in the open position indicated in dotted lines in Fig. 4.

In the operation of our above described coupling device, assuming that it is desired to connect the plow illustrated in Fig. 1 to the vehicle frame: The operating levers 24 are first raised to the unlocked position illustrated in dotted lines in Fig. 4. This will act to withdraw the locking bolt 21 so that the notches 17 of the hooks 16 will be opened.

The frame 10 with the plow thereon is then lifted and the hooks 16—16 are passed under the forward portion of the vehicle body and lowered over the bolts 18—18 so that the said bolts would be received in the notches 17—17. The levers 24—24 are then simply rocked downwardly against the top surfaces of the channel bars 27—27 and the counter-weights 28—28, in addition to the action of the ball 32 of each lever, will retain the said levers in locked position.

From the above description, it will be understood that our invention provides a device which is simple in its operation and is of particular importance due to the fact that such devices are used mostly in severe weather when it is particularly difficult to operate intricate mechanisms in inconvenient positions with bare hands.

We claim:

1. For a supporting frame comprising a pair of spaced channel bars and a tie bar connecting said channel bars, a coupling device including a hook portion extending rearwardly from said tie bar opposite each channel bar, the said hook portion including a notch opening downwardly therein, a locking bolt slidable longitudinally in said hook portion and across said notch, an operating lever pivotally mounted on the channel bar, a link connecting said lever to said bolt, and a weight portion on said lever for gravitally urging the locking bolt in locking position.

2. A supporting frame of the character described including a pair of spaced channelled bars, a tie bar securing said spaced bars together, a lateral projection on said tie bar opposite each of said spaced bars and forming a hook portion having a notch therein opening downwardly, a locking bolt slidable longitudinally in said hook portion, across said notch and through said tie bar, a bracket extending upwardly on each of said spaced bars, an operating lever pivoted to each of said brackets and connected to the said locking bolts, a counterweight at the end of said lever adapted to rest upon the top of the channel bar for normally retaining said lever in position to retain the locking bolt in locking position.

3. A device of the character described including a frame for supporting a plow or the like, the said frame comprising a pair of spaced channel bars, a tie bar connecting said channel bars, a hook portion extending rearwardly from said tie bar in line with each of said channel bars, the said hook portion having a notch therein opening downwardly, and a separate opening running longitudinally in said hook portion and crosswise to the first opening and below the top of the first opening, a locking bolt slidable in said separate opening and across the first opening and extending rearwardly through the said tie bar, a bracket extending upwardly from the channelled bar and in line with the edge of the upper portion thereof, a lever pivoted and having an arm extending downwardly therefrom, a link connecting said locking bolt to the end of said arm for sliding said locking bolt upon the rocking of said lever, a counter-weight at the end of said lever for normally retaining said locking bolt in locking position, the said counter-weight being adapted to rest upon the top of the channel bar for positioning the locking lever.

4. A device of the character described including a frame for supporting a plow or the like, the said frame comprising a pair of spaced channel bars, a tie bar connecting said channel bars, a hook portion extending rearwardly from said tie bar in line with each of said channel bars, the said hook portion having a notch therein opening downwardly, and a separate opening running longitudinally in said hook portion and crosswise to the first opening and below the top of the first opening, a locking bolt slidable in said separate opening and across the first opening and extending rearwardly through the said tie bar, a bracket extending upwardly from the channelled bar and in line with the edge of the upper portion thereof, a lever pivoted and having an arm extending downwardly therefrom, a link connecting said locking bolt to the end of said arm for sliding said locking bolt upon the rocking of said lever, a counter-weight at the end of said lever for normally retaining said locking bolt in closed position, the said counter-weight being adapted to rest upon the top of the channel bar for positioning the locking lever, a pivoting pin or bolt extending through said lever and bracket for pivoting the lever to the bracket, spring means on said pin normally urging the lever towards the bracket, and positioning means between said lever and bracket for retaining the lever in raised position for holding the locking bolt in open position.

ALLAN B. NEARING.
EDWARD U. SANDIN.

REFERENCES CITED

The following references are of record in the file of this patent:

UNITED STATES PATENTS

| Number | Name | Date |
| --- | --- | --- |
| 969,595 | Blossfeld | Sept. 6, 1910 |
| 1,353,094 | Trumpour | Sept. 14, 1920 |
| 2,158,780 | Vogt | May 16, 1939 |